United States Patent
Katsukura et al.

[11] Patent Number: 6,015,490
[45] Date of Patent: Jan. 18, 2000

[54] CARRIER-SEPARATING AND WATER-COLLECTING MECHANISM OF WASTEWATER TREATMENT EQUIPMENT

[75] Inventors: Noboru Katsukura; Takehiko Yamada; Eiji Tochikubo, all of Tokyo, Japan

[73] Assignee: Ebara Corporation, Tokyo, Japan

[21] Appl. No.: 08/952,610

[22] PCT Filed: May 23, 1996

[86] PCT No.: PCT/JP96/01364

§ 371 Date: Mar. 9, 1998

§ 102(e) Date: Mar. 9, 1998

[87] PCT Pub. No.: WO96/37443

PCT Pub. Date: Nov. 28, 1996

[30] Foreign Application Priority Data

May 23, 1995 [JP] Japan ................................. 7-146960
Feb. 14, 1996 [JP] Japan ................................. 8-049640

[51] Int. Cl.⁷ .................................................. C02F 3/02
[52] U.S. Cl. .................... 210/151; 210/256; 210/393; 210/501; 210/616
[58] Field of Search ................................. 210/150, 151, 210/256, 393, 402, 501, 616

[56] References Cited

U.S. PATENT DOCUMENTS

| | | | |
|---|---|---|---|
| 870,138 | 11/1907 | Stump et al. ........................... | 210/393 |
| 1,557,235 | 10/1925 | Bechhold ................................ | 210/501 |
| 3,000,507 | 9/1961 | Young ..................................... | 210/393 |
| 3,713,540 | 1/1973 | Davidson et al. ....................... | 210/402 |
| 4,090,965 | 5/1978 | Fuchs ..................................... | 210/151 |
| 4,663,046 | 5/1987 | Feldkirchner et al. ................. | 210/616 |
| 4,705,634 | 11/1987 | Reimann et al. ....................... | 210/151 |
| 5,458,779 | 10/1995 | Odegaard ............................... | 210/150 |

FOREIGN PATENT DOCUMENTS

| | | |
|---|---|---|
| 0 209 877 | 1/1987 | European Pat. Off. . |
| 0 417 367 | 3/1991 | European Pat. Off. . |
| 0 697 234 | 2/1996 | European Pat. Off. . |
| 39 05 164 | 8/1990 | Germany . |
| 63-248499 | 10/1988 | Japan . |
| 2-63514 | 3/1990 | Japan . |
| 2-164494 | 6/1990 | Japan . |

OTHER PUBLICATIONS

Concurrently filed U.S. Patent Application corresponding to PCT/JP96/01365, Filed May 23, 1996, entitled "Method for Aerobically Treating Liquid–Waste and Treatment Tank" by Noboru Katsukura et al.

*Primary Examiner*—Christopher Upton
*Attorney, Agent, or Firm*—Wenderoth, Lind & Ponack, L.L.P.

[57] ABSTRACT

A carrier-separating and liquid-collecting mechanism in a liquid-waste treatment apparatus having a treatment tank in which carriers having microorganisms immobilized thereon are suspended. The carrier-separating and liquid-collecting mechanism includes a cylindrical screen (13) and a liquid-collecting devices (14) disposed in the cylindrical screen. The cylindrical screen is provided in the treatment tank, such that the axis of the cylindrical screen extends in a substantially horizontal direction. The liquid-collecting device is a pipe or a gutter having liquid-collecting holes, and is capable of collecting liquid at a plurality of positions through the cylindrical screen. The carrier-separating and liquid-collecting mechanism may further include a rotation mechanism for supporting the cylindrical screen and intermittently rotating the cylindrical screen on the axis thereof and a brush (18) which is fixed so as to be in parallel to the cylindrical screen in contact with the cylindrical screen. A surface of the cylindrical screen is covered with a bactericidal substance or an algicidal substance.

12 Claims, 4 Drawing Sheets

CARRIER-SEPARATING AND WATER-COLLECTING MECHANISM OF WASTEWATER TREATMENT EQUIPMENT

BACKGROUND OF THE INVENTION

1. Technical Field

The present invention relates to a carrier-separating and liquid-collecting mechanism for use in a liquid-waste treatment apparatus for biologically treating organic liquid-waste, such as sewage, human excrement and industrial liquid-waste, utilizing carriers having microorganisms immobilized thereon.

2. Description of Related Art

In recent years, as liquid-waste treatment techniques, an activated sludge method, a biomembrane method and an immobilized microorganism method have been known. From the viewpoint of efficient utilization of land, it has been desired to develop a liquid-waste treatment method which is space-saving, and a method for an aerobic treatment of liquid-waste utilizing carriers having microorganisms immobilized thereon and an improvement of performance of those carriers have attracted attention. The present inventors have been working on the development of an apparatus for biologically treating liquid-waste utilizing microorganism-immobilized carriers, and have encountered the below-mentioned technical problems during a process of the development.

That is, when microorganism-immobilized carriers flow through a treatment tank, together with a liquid to be treated, the concentration of carriers near an outflow end of the treatment tank becomes high, so that scum and contaminants (impurities) adhere to a carrier-separating and liquid-collecting mechanism in the form of a screen disposed at the outflow end of the treatment tank, thereby increasing the liquid level in the treatment tank. Consequently, the treatment tank must be cleaned intermittently, by using industrial water and the like. Thus, in the above-mentioned treatment tank, the treatment performance is lowered because a uniform distribution of the carriers cannot be maintained, and a blockage of the outflow end of the treatment tank occurs.

SUMMARY OF THE INVENTION

It is an object of the present invention to provide a carrier-separating and liquid-collecting mechanism which is free from the above-mentioned technical problems and which is capable of positively maintaining microorganism-immobilized carriers in the treatment tank. It is another object of the present invention to suppress an increase in liquid level in the treatment tank due to adhesion of scum and impurities to the carrier-separating and liquid-collecting mechanism at the outflow end of the treatment tank. It is a further object of the present invention to render unnecessary a cumbersome operation for the removal of scum and impurities from the carrier-separating and liquid-collecting mechanism.

According to the present invention, in a liquid-waste treatment apparatus having a treatment tank in which carriers having microorganisms immobilized thereon are suspended, a carrier-separating and liquid-collecting mechanism comprising a cylindrical screen and a liquid-collecting collecting means covered with the cylindrical screen is provided, such that the axis of the cylindrical screen extends in a substantially horizontal direction. The liquid-collecting means is capable of collecting a liquid at a plurality of positions in the cylindrical screen. Illustratively stated, the liquid-collecting means comprises a pipe or a gutter having liquid-collecting holes. The liquid-collecting holes are a large number of small holes or narrow openings extending in the direction of the axis of the liquid-collecting means.

With respect to the cylindrical screen, it may be fixed in the treatment tank. However, it is preferred that the cylindrical screen be adapted to be rotated on the axis thereof by a rotation mechanism and be engaged with a screen brush which is fixed so as to be in parallel to and contact with the cylindrical screen. It is preferred that the rotation mechanism be capable of intermittently rotating the cylindrical screen. It is preferred that a surface of the cylindrical screen be covered with a bactericidal substance or an algicidal substance.

The carrier-separating and liquid-collecting mechanism is disposed so as to project from a side wall of the treatment tank toward the center of the treatment tank, i.e., toward the upstream side in the treatment tank. Preferably, the cylindrical screen is made of SS or SUS, which is plated with copper or coated with semiconductors (Ti compounds, such as titanium oxide), to thereby impart the cylindrical screen with a bactericidal ability and reduce the amount of scum adhered to the cylindrical screen, so that materials adhered to the cylindrical screen can be easily removed.

With respect to the number of the carrier-separating and liquid-collecting mechanisms, a single carrier-separating and liquid-collecting mechanism may be employed, depending on the capacity and shape of the treatment tank. In the carrier-separating and liquid-collecting mechanism, a liquid is collected at a plurality of positions by the liquid-collecting means in the cylindrical screen. When a pipe is used as the liquid-collecting means, an end portion of the pipe which is positioned within the treatment tank may be closed or have an opening. When a plurality of carrier-separating and liquid-collecting mechanisms are employed, it is possible to arrange the carrier-separating and liquid-collecting mechanisms either in parallel to the flow of liquid in the treatment tank or transversely relative to the treatment tank, depending on the shape of the treatment tank, the amount of liquid introduced into the treatment tank and the like.

The liquid-waste treatment apparatus provided with the carrier-separating and liquid-collecting mechanism of the present invention can be applied to an aerobic process in a circulation type nitriding denitrogenation method in which an oxygen-free process, an aerobic process and a precipitation process are successively conducted, while circulating a liquid from the aerobic process to the oxygen-free process and returning sludge precipitated in the precipitation process to the oxygen-free process, and an aerobic process in a denitrogenation•dephosphorization activated sludge method in which an anaerobic process, an oxygen-free process, an aerobic process and a precipitation process are successively conducted, while returning sludge precipitated in the precipitation process to the anaerobic process. Needless to say, the liquid-waste treatment apparatus provided with the carrier-separating and liquid-collecting mechanism of the present invention may be applied to an anaerobic process and an oxygen-free process.

When the carrier-separating and liquid-collecting mechanism of the present invention is employed in a conventional aeration tank in which microorganism-immobilized immobilized carriers are utilized in order to improve the treatment performance, the carrier-separating and liquid-collecting mechanism can be easily provided at each of an inlet and an outlet of the aeration tank. With respect to the microorganism-immobilized carriers, it is preferred that the carriers be in a particulate form and made of, for example, sand, activated carbon, polyurethane foam, polyvinyl alcohol, polypropyrene, polyethylene, polyethylene glycol and cellulose. However, the material for the microorganism-immobilized carriers is not limited to the above-mentioned materials. The gravity of the microorganism-immobilized carriers is preferably a value which is slightly larger than that of a liquid to be treated, for example, about 1.02. As a method for immobilizing microorganisms on the carriers, an adhesion immobilization method is generally employed. An entrapment immobilization method is also applicable.

In the carrier-separating and liquid-collecting mechanism of the present invention comprising a cylindrical screen and a pipe or the like covered with the cylindrical screen, a treated liquid is collected at a plurality of positions, so that a non-uniform distribution of the carriers due to the flow of liquid in the treatment tank can be avoided, to thereby maintain a uniform distribution of the carriers. Further, in the carrier-separating and liquid-collecting mechanism of the present invention, concentrations of scum and impurities are unlikely to occur, to thereby prevent a blockage of the outflow end of the treatment tank. When the carrier-separating and liquid-collecting mechanism of the present invention is imparted with a bactericidal ability or an algicidal ability, a blockage of the cylindrical screen due to adhesion of microorganisms can be avoided. When the carrier-separating and liquid-collecting mechanism of the present invention is applied to an aerobic treatment tank, air bubbles rising in the treatment tank directly contact with a lower surface of the cylindrical screen, so that the amount of contacting air bubbles per unit area of the screen becomes larger than that when a screen is disposed near the outflow end of the treatment tank, and therefore cleaning of the screen can be effectively conducted by air.

BRIEF DESCRIPTION OF THE DRAWINGS

FIG. 2a shows a vertical cross-section of the liquid-waste treatment apparatus of FIG. 1. FIG. 2b shows a vertical cross-section of a liquid-waste treatment apparatus of a type which is different from FIG. 1.

DETAILED DESCRIPTION OF THE INVENTION

Figure 1:
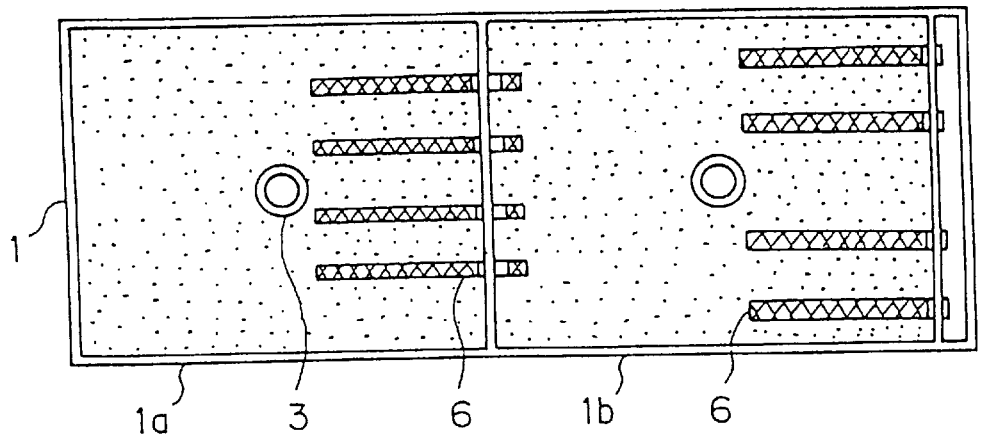
FIG. 1 is a top view of a liquid-waste treatment apparatus provided with the carrier-separating and liquid-collecting mechanism according to one embodiment of the present invention.

Hereinbelow, embodiments of the present invention are described, with reference to the accompanying drawings. However, the present invention is not limited to the following embodiments and is defined by the appended claims. In the drawings, like parts and portions are designated by like numerals, and overlapping is avoided with respect to description of those parts and portions.

Figure 2:
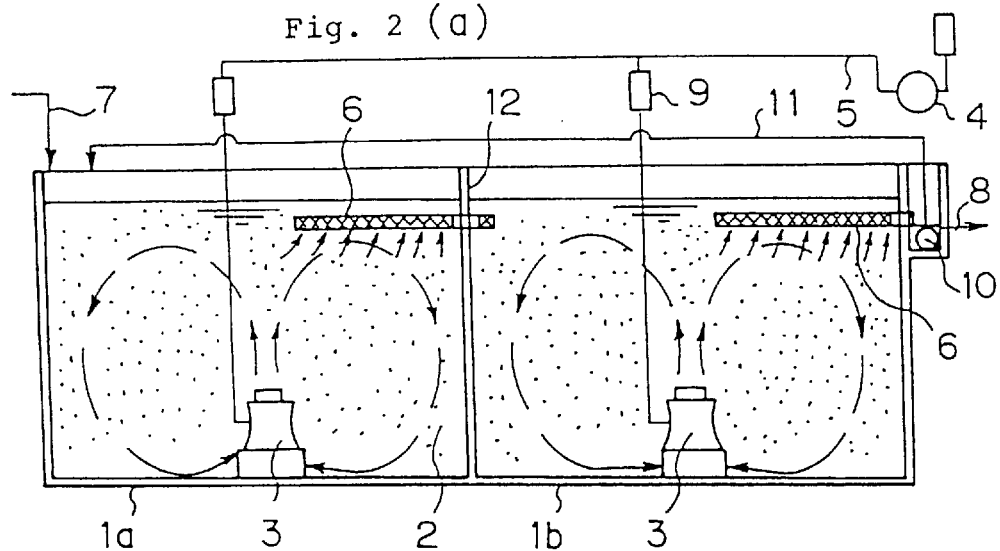
FIGS. 2(a) and 2(b) shows vertical cross-sections of liquid-waste treatment apparatuses.
Figure 2:
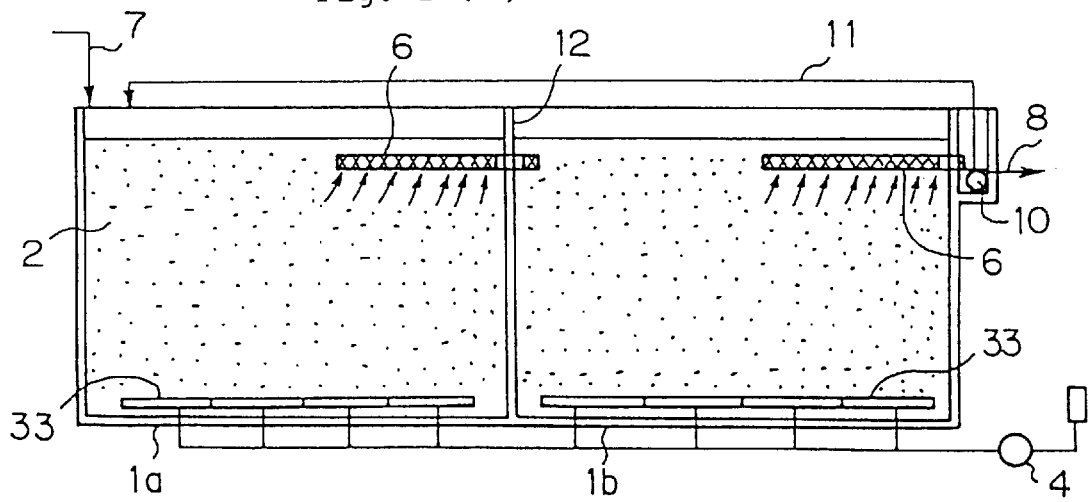

A liquid-waste treatment apparatus 1 shown in FIG. 1 and FIG. 2a comprises aerobic treatment tanks 1a and 1b, microorganism-immobilized carriers 2, underwater agitation type aerators (underwater aerators) 3, a blower 4, an air pipe 5, carrier-separating and liquid-collecting mechanisms 6, a liquid-waste introducing pipe 7, a treated liquid discharging pipe 8, a circulating liquid pump 10, a circulating liquid pipe 11 and a partition 12. The liquid-waste treatment apparatus 1 shown in FIG. 2b is substantially the same as the liquid-waste treatment apparatus of FIG. 2a, except that full aeration type diffusers 33 are used, instead of the underwater agitation type aerators (underwater aerators) 3.

In the liquid-waste treatment apparatus 1, liquid-waste flows through the liquid-waste introducing pipe 7 into the aerobic treatment tank 1a. While being aerated and agitated by the underwater agitation type aerator 3 or aerated by the full aeration type diffuser 33, the liquid-waste is biologically treated with the microorganism-immobilized carriers 2 which are uniformly distributed in the aerobic treatment tank 1a. The thus treated liquid-waste is collected in the carrier-separating and liquid-collecting mechanisms 6, and flows thorough the partition 12 and is introduced into the aerobic treatment tank 1b.

In the aerobic treatment tank 1b, while being aerated and agitated by the underwater agitation type aeration apparatus 3 or aerated by the full aeration type diffuser 33, the liquid-waste is biologically treated with the microorganism-immobilized carriers. The resultant treated liquid is collected in the carrier-separating and liquid-collecting mechanisms 6 and discharged from the treated liquid discharging pipe 8. In each of the treatment tanks 1a and 1b in the liquid-waste collecting apparatus of FIG. 1, four carrier-separating and liquid-collecting mechanisms are provided, and the treated liquid is collected at different positions by these four carrier-separating and liquid-collecting mechanisms, so that accumulation of the carriers does not occur.

Figure 3:
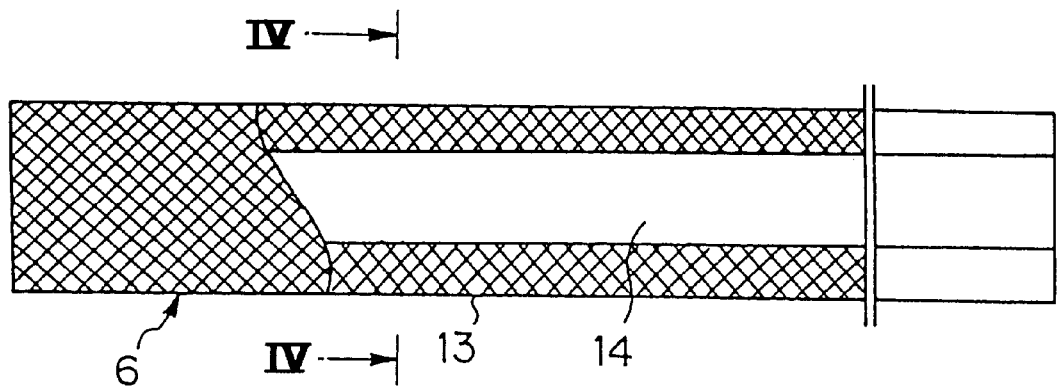
FIG. 3 is a partially cut-away top view of a carrier-separating and liquid-collecting mechanism according to a first embodiment of the present invention.
Figure 4:
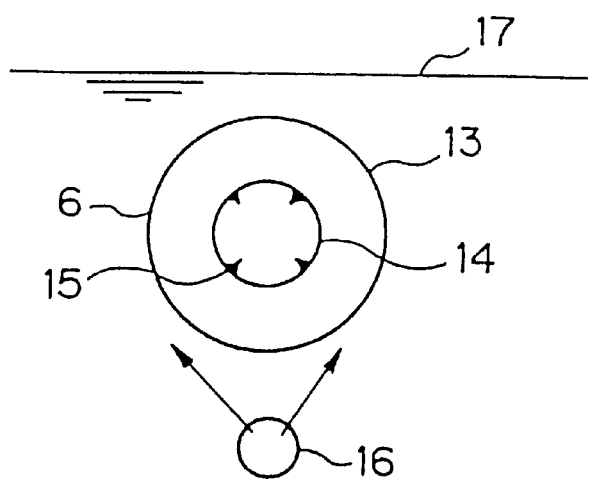
FIG. 4 is a cross-sectional view of the carrier-separating and liquid-collecting mechanism of FIG. 3, taken along line IV—IV.

The carrier-separating and liquid-collecting mechanism 6 comprises a cylindrical screen 13 in which a pipe 14 having formed therein liquid-collecting holes 15 is disposed. The carrier-separating and liquid-collecting mechanism 6 shown in FIG. 3 and FIG. 4 is disposed below the surface of the liquid. An air-cleaning pipe 16 for removal of scum is provided below the carrier-separating and liquid-collecting mechanism 6.

Figure 5:
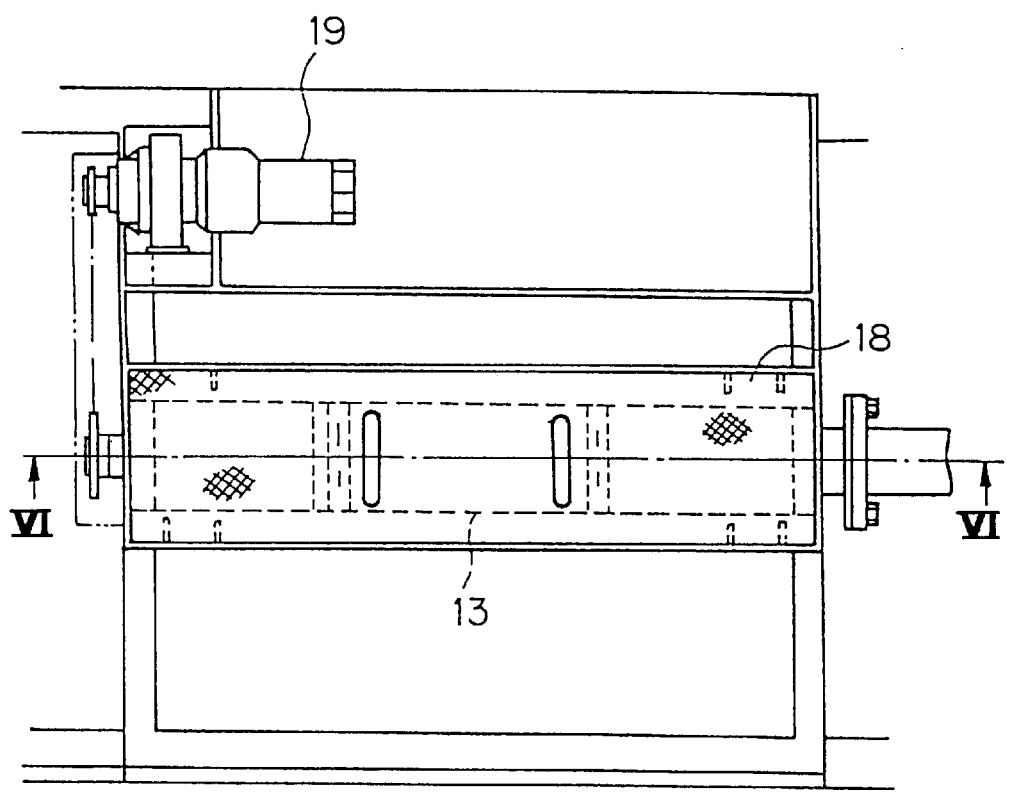
FIG. 5 is a partially cut-away top view of a carrier-separating and liquid-collecting mechanism according to a second embodiment of the present invention.
Figure 6:
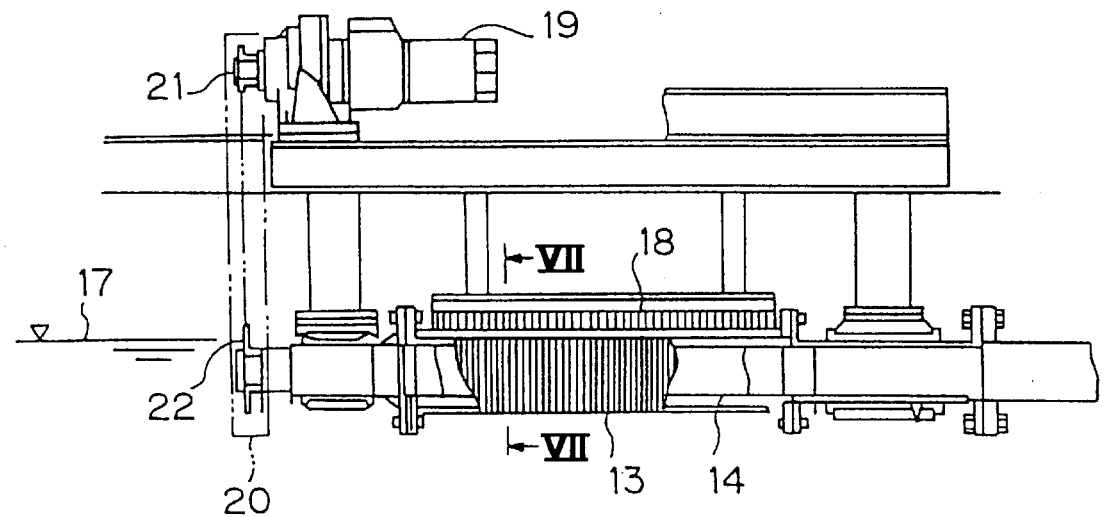
FIG. 6 is a cross-sectional view of the carrier-separating and liquid-collecting mechanism of FIG. 5, taken along the line VI—VI.
Figure 7:
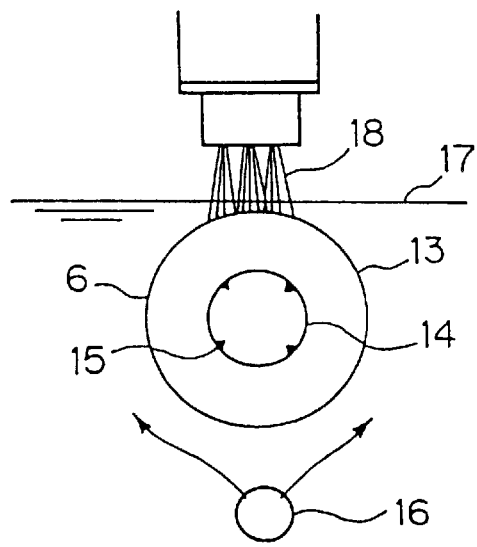
FIG. 7 is a cross-sectional view of the carrier-separating and liquid-collecting mechanism of FIG. 6, taken along the line VII—VII, in which an air-cleaning pipe is provided.

The carrier-separating and liquid-collecting mechanism 6, shown in FIGS. 5 to 7, is of a type which is different from the above-described carrier-separating and liquid-collecting mechanism. This carrier-separating and liquid-collecting mechanism 6 comprises the cylindrical screen 13, the pipe 14 having formed therein the liquid-collecting holes 15, a rotation mechanism 19 for rotating the cylindrical screen 13 on the axis thereof and a brush 18 which is fixed so as to be in parallel to the cylindrical screen 13 and in contact with the cylindrical screen 13.

Preferably, the cylindrical screen 13 has a mesh size of from about 1 mm to about 5 mm which is smaller than the average diameter of the carriers. The cylindrical screen 13 is made of copper-plated SS or copper-plated SUS. The pipe 14 is made of SUS, and has drilled holes (which may be narrow openings, i.e., slits) as the liquid-collecting holes 15 along an entire circumference of the pipe 14.

In the carrier-separating and liquid-collecting mechanism of the present invention, only the treated liquid is collected through the entire surface of the pipe, so that the liquid pressure is not locally applied and accumulation of the carriers does not occur. Incidentally, in FIGS. 1 and 2, when an anaerobic denitrogenation tank and an aerobic nitriding tank are used as the treatment tanks 1a and 1b, respectively, and the treated liquid in the nitriding tank is circulated through the circulating liquid pipe 11 to the denitrogenation tank by the circulating liquid pump 10, the circulation type nitriding denitrogenation method can be practiced. In this instance, the underwater aerator in the treatment tank 1a does not need to perform aeration and performs only agitation.

FIG. 5 is a partially cut-away side view of a carrier-separating and liquid-collecting mechanism provided with a rotation mechanism for rotating the cylindrical screen. FIG. 6 is a partially cut-away side view of the carrier-separating and liquid-collecting mechanism of FIG. 5, and FIG. 7 is a cross-sectional view of the carrier-separating and liquid-collecting mechanism of FIG. 6, taken along the line VII—VII.

With respect to the arrangement of the rotation mechanism 19, a motor may be connected to the cylindrical screen through a sprocket wheel, and rotated. It is preferred that the brush 18 be fixedly provided so as to contact the cylindrical screen 13. It is especially preferred to provide the brush 18 on the surface of the liquid, because when the materials (such as scum) which are adhered to the cylindrical screen are scraped off by the brush, they are smoothly detached from the cylindrical screen. The material and shape of the brush may be selected from those which have conventionally been employed.

In the carrier-separating and liquid-collecting mechanism arranged as mentioned above, only the treated liquid is collected through the entire surface of the pipe, so that the liquid pressure is not locally applied and accumulation of the carriers does not occur. For rotating the cylindrical screen 13, rotation of the motor 19 is transmitted from the sprocket wheel 21 on the driving side through a chain to a sprocket wheel 22 on the driven side, so that the cylindrical screen as a whole rotates on the axis thereof. The cylindrical screen 13 is arranged, such that it is sealed to a connection pipe by a V-ring or the like so as to be capable of rotating independently from the connection pipe.

EFFECTS OF THE INVENTION

By use of the carrier-separating and liquid-collecting mechanism of the present invention for collecting a treated liquid in a treatment tank in a liquid-waste treatment apparatus, the treated liquid is collected at a plurality of positions, so that in the treatment tank, non-uniform distribution of the carriers due to the flow of liquid-waste can be avoided and a blockage of the screen due to a concentration of scum is unlikely to occur. Further, when the carrier-separating and liquid-collecting mechanism of the present invention is applied to an aerobic tank and an anaerobic tank in a corrosive atmosphere, because cleaning of the screen is effectively conducted by air, an apparatus for cleaning the screen is unnecessary and an operation for maintenance of the liquid-waste treatment apparatus can be minimized, thereby lowering initial costs. Further, in the carrier-separating and liquid-collecting mechanism of the present invention, collection of the treated liquid can be stably conducted by automatically cleaning the screen by the rotation mechanism.

We claim:

1. A carrier-separating and liquid-collecting mechanism in a liquid-waste treatment apparatus having a treatment tank in which carriers having microorganisms immobilized thereon are suspended, said carrier-separating and liquid-collecting mechanism comprising:

a plurality of cylindrical screens and a plurality of liquid-collecting means disposed in said cylindrical screens, respectively, wherein said cylindrical screens are disposed in said treatment tank such that an axis of each of said cylindrical screens extends in a substantially horizontal direction from a side wall of said treatment tank toward a center of said treatment tank, and said liquid-collecting means is capable of collecting liquid at a plurality of positions in each cylindrical screen; and an air cleaning pipe, for removing scum, disposed below at least one of said cylindrical screens.

2. The carrier-separating and liquid-collecting mechanism as claimed in claim 1, wherein said liquid-collecting means is a pipe or a gutter provided with a plurality of liquid-collecting holes.

3. The carrier-separating and liquid-collecting mechanism as claimed in claim 1, further comprising:

a plurality of rotation mechanisms for supporting said cylindrical screens, respectively, wherein said rotation mechanisms rotate said cylindrical screens about the axes thereof; and a plurality of brushes in contact with and fixed relative to said cylindrical screens, respectively, wherein each of said brushes extends in parallel to said respective cylindrical screen.

4. The carrier-separating and liquid-collecting mechanism as claimed in claim 3, wherein each of said rotation mechanisms is capable of intermittently rotating said respective cylindrical screen.

5. The carrier-separating and liquid-collecting mechanism as claimed in claim 1, wherein said liquid-collecting means is a pipe or a gutter provided with a plurality of liquid-collecting holes, and further comprises:

a plurality of rotation mechanisms for supporting said cylindrical screens, respectively, wherein said rotation mechanisms rotate said cylindrical screens about the axes thereof; and a plurality of brushes in contact with and fixed relative to said cylindrical screens, respectively, wherein each of said brushes extends in parallel to said respective cylindrical screen.

6. The carrier-separating and liquid-collecting mechanism as claimed in claim 5, wherein each of said rotation mechanisms is capable of intermittently rotating said respective cylindrical screen.

7. The carrier-separating and liquid-collecting mechanism as claimed in claim 6, wherein a surface of each of said cylindrical screens is covered with a bactericidal substance or an algicidal substance.

8. A liquid-waste treatment apparatus comprising:

a first treatment tank in which carriers having microorganisms immobilized thereon are suspended;

a liquid-waste delivery pipe communicating with said first treatment tank;

a plurality of carrier-separating and liquid-collecting mechanisms disposed in said first treatment tank and extending horizontally and in parallel to each other from a sidewall of said first treatment tank toward a center of said first treatment tank, wherein each of said carrier-separating and liquid-collecting mechanisms comprises a conduit having a plurality of liquid collecting holes, and a cylindrical screen surrounding said conduit; and an air cleaning pipe disposed below at least one of said cylindrical screens for removing scum therefrom.

9. The liquid-waste treatment apparatus as claimed in claim 8, wherein each of said carrier-separating and liquid collecting mechanisms further comprises a brush fixed in position so as to contact said cylindrical screen, and a rotary drive mechanism for rotating said cylindrical screen relative to said brush.

10. The liquid-waste treatment apparatus as claimed in claim 9, further comprising:

a second treatment tank in which carriers having microorganisms immobilized thereon are suspended, wherein said carrier-separating and liquid-collecting mechanisms disposed in said first treatment tank are in fluid communication with said second treatment tank;

a treated liquid discharge pipe in communication with said second treatment tank; and a plurality of carrier-separating and liquid-collecting mechanisms disposed in said second treatment tank and extending horizontally and in parallel to each other from a sidewall of said second treatment tank toward a center of said second treatment tank.

11. The liquid-waste treatment apparatus as claimed in claim 9, wherein said rotary drive mechanisms are capable of intermittently rotating said cylindrical screens, respectively.

12. The liquid-waste treatment apparatus as claimed in claim 9, wherein a surface of each of said cylindrical screens is covered with a bactericidal substance or an algicidal substance.

* * * * *